(No Model.) 12 Sheets—Sheet 2.

V. T. BRIGGS.
WIRE FENCE MACHINE.

No. 517,837. Patented Apr. 10, 1894.

Witnesses
Louis G. Julihn.
E. G. Julihn.

Inventor
V. T. Briggs.
By Hopkins & Atkins
Attorneys (No Model.)  12 Sheets—Sheet 3.

V. T. BRIGGS.
WIRE FENCE MACHINE.

No. 517,837.  Patented Apr. 10, 1894.

Fig.3.

Witnesses  
Louis Julihn  
E. L. Julihn

Inventor  
V. T. Briggs  
By Hopkins  
and Atkins  
Attorneys (No Model.) 12 Sheets—Sheet 4.

V. T. BRIGGS.
WIRE FENCE MACHINE.

No. 517,837. Patented Apr. 10, 1894.

Fig. 4.

Witnesses
Louis G. Julihn
E. G. Julihn

Inventor
V. T. Briggs
By Hopkins and Atkins
Attorneys (No Model.)  12 Sheets—Sheet 7.

V. T. BRIGGS.
WIRE FENCE MACHINE.

No. 517,837. Patented Apr. 10, 1894.

Fig. 7.

Witnesses
Louis G. Julihn
E. G. Julihn

Inventor
V. T. Briggs
By Hopkins
and Atkins
Attorneys (No Model.) 12 Sheets—Sheet 8.

V. T. BRIGGS.
WIRE FENCE MACHINE.

No. 517,837. Patented Apr. 10, 1894.

Fig. 8.

Witnesses
Louis G. Julihn
E. G. Julihn

Inventor
V. T. Briggs
By Hopkins
& Atkins
Attorneys (No Model.)  12 Sheets—Sheet 10.

V. T. BRIGGS.
WIRE FENCE MACHINE.

No. 517,837. Patented Apr. 10, 1894.

Fig. 10

Witnesses  
Louis G. Julihn  
E. G. Julihn

Inventor  
V. T. Briggs  
By Hopkins  
and Atkins  
Attorneys

UNITED STATES PATENT OFFICE.

VANRENSSELAER T. BRIGGS, OF NORTH LANSING, MICHIGAN.

WIRE-FENCE MACHINE.

SPECIFICATION forming part of Letters Patent No. 517,837, dated April 10, 1894.

Application filed November 11, 1892. Serial No. 451,685. (No model.)

*To all whom it may concern:*

Be it known that I, VANRENSSELAER T. BRIGGS, of North Lansing, county of Ingham, and State of Michigan, have invented certain new and useful Improvements in Fence-Machines, of which the following is a specification, reference being had to the accompanying drawings.

The object of my invention is to produce a machine for manufacturing a strong, durable, all wire fence; and which is equally adapted for manufacturing the fence upon the ground where it is to be used, or in a factory for shipment to the place of use.

My invention consists in certain combinations and arrangements of parts as will hereinafter more fully appear as described in detail in the specification, and succinctly stated in the appended claims.

In the accompanying drawings.

Referring to the figures on the drawings, 1 indicates two supports, which may be suitably borne upon a base 2, and may be provided with braces 3 for sustaining the tension of horizontal or warp wires 4 which are, in practice, strung between them.

Suitable means for securing the wires upon one of the supports may be provided, and upon the other suitable devices for stretching the wires may be employed. Such supports would be in practice employed where the fence was being manufactured for shipment; but if the fence were being made upon the ground, the supports would be in practice fence posts, and the base would be the ground in which they were inserted.

5 indicates a platform, upon which is carried a frame 6 that is designed to travel longitudinally upon the platform, and is for that purpose preferably provided with wheels 7.

Suitable propelling mechanism that may be gaged to impart a certain predetermined motion to the frame at each operation is preferably employed. The mechanism illustrated for this purpose, and which I now consider preferable, consists of a rack 8 suitably secured to the platform and extending from end to end thereof. 9 indicates brackets fastened at one end, as by screws 10, to the end of the frame, and provided in their opposite extremities with a bearing-pin 11, upon which is revolubly carried a gear 12, provided upon one side with a preferably integral ratchet, and with a measuring disk 13, to which is secured a hand-lever 14, and upon which is pivoted a pawl 15 that engages with the ratchet upon the gear. The measuring disk is provided with a suitable adjustable stop 16, which may consist of a block provided with a set screw 17 adapted to enter graduated perforations 18 upon the measuring disk; and by striking against the adjacent bracket-arm to limit the motion of the measuring disk, and thereby to control the distance of travel of the gear upon the rack. The distance of travel may be regulated by the adjustment of the stop-piece upon the measuring disk.

The frame of the machine preferably consists of two flat end pieces 19, preferably composed of metal, and united at their tops and bottoms by cross pieces 20, and by main bolts 21. Boxes 22, upon the ends of the cross pieces, are preferably provided for lending rigidity to the frame. The frame is designed to carry any desirable number of twisters, each of which consists of a hollow shaft 23, provided upon each end with disk-heads 24 that turn in suitable bearings 25 in the ends of the frame.

26 indicates a bearing plate secured across each of the bearings in the forward end of the frame. It revolubly supports the hollow shaft at its end, and being intermediate between the disk-head at that end of the shaft and the gear 27 which is secured, as by a screw 28 to this end of the shaft, prevents longitudinal movement of the shaft, and holds the disk-heads true in their bearings. Each of the gears 27 meshes with its neighbor, and one of the gears—preferably the central one—is adapted to be rotated in any suitable and convenient manner; and thereby to impart synchronous rotary motion to all the rest. I have illustrated suitable mechanism for accomplishing this result, which consists of a bevel-gear 29 secured, as by screws 30, to the face of the gear 27, that is secured to the middle one of the hollow shafts 23. With this bevel-gear a bevel-pinion 31, carried upon a shaft 32, that is revolubly supported in suitable bearings 33 projecting from the face of the end plate, meshes. Power may be applied to the shaft at its extremity, as through a crank 34 secured to the end of the shaft. Other suitable means, however, as for example a driving wheel or pulley may be substituted for the crank.

Upon the faces of the disk-heads that are opposite to the geared ends of the shafts 23 are secured bobbin frame guide-plates 35. These preferably consist of a pair of plates secured upon the opposite sides of each of the disk-heads. A notch 36 for each pair of guide-plates is provided in the periphery of each of the disk-heads. Each of the disk-heads at the geared ends of the hollow shaft is provided only with two opposite notches 37. The object of the notches in the disk-heads is to carry the bobbin frames, and the office of the bobbin frame guide-plates is to assist in shifting the bobbin frames from one twister to the other. For this purpose I employ aligning bars 38 that are respectively pivotally united to levers 39, pivoted, as indicated at 40, to the end plate near its bottom, and in like manner to bell-crank levers 41, pivoted as indicated at 42, to the end plate near its top. It will be perceived that by imparting motion to the bell-crank levers a parallel movement will be imparted to the aligning bars; and that by forcing them toward each other the aligning bars will come into engagement with the sides of the bobbin-frame guide-plates and force them into perfect rigid alignment. For the purpose of operating the aligning bars I prefer to employ a lever 43 pivotally carried, as upon a bridge bearing 44, that is secured to the opposite end plates of the frame. A toggle-joint 45, fastened at one end to the extremity of the lever and having its branches pivotally united to the ends of the bell-crank levers, respectively, may be employed.

Each of the bobbin frames preferably consists of a spring metal plate 46, that is provided upon one end with a hub 47 that has a squared end 48 to engage with the notch 37 in the disk-head on the geared end of its shaft. Each bobbin-frame is provided at the other end with a hub and squared end similar in all respects to the corresponding parts at the geared end, except that it is provided with an aperture or opening through which are passed, respectively, the mesh wires 49 from the bobbins 50. The squared ends of the bobbin frames are also wider at this end than at the geared end and in use work in the notches of their adjacent disk heads like intermeshing cogs. The bobbins are revolubly carried between the bobbin-frame plate and a tension plate 51.

52 indicates a post secured at one end as by screw 53, to the frame plate and provided at the other end with a screw-threaded bore to receive a screw 54 seated in the tension plate by which the tension upon the bobbin may be controlled.

Figure 1:
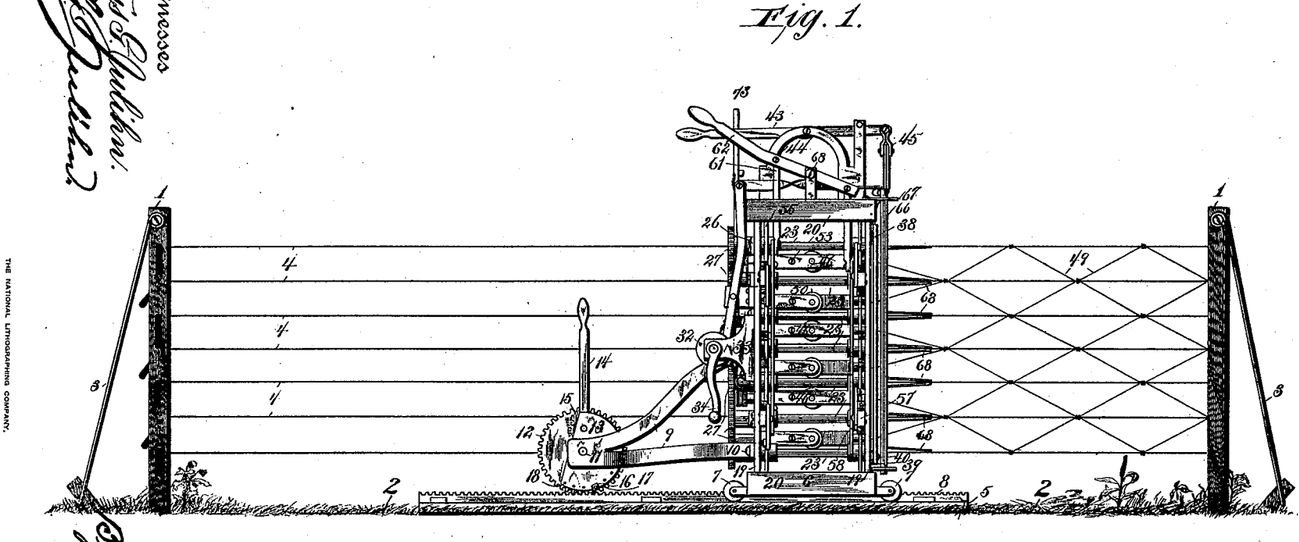
Figure 1 is a side elevation of a section of fence in process of construction with my machine as in use.
Figures 2, 13:
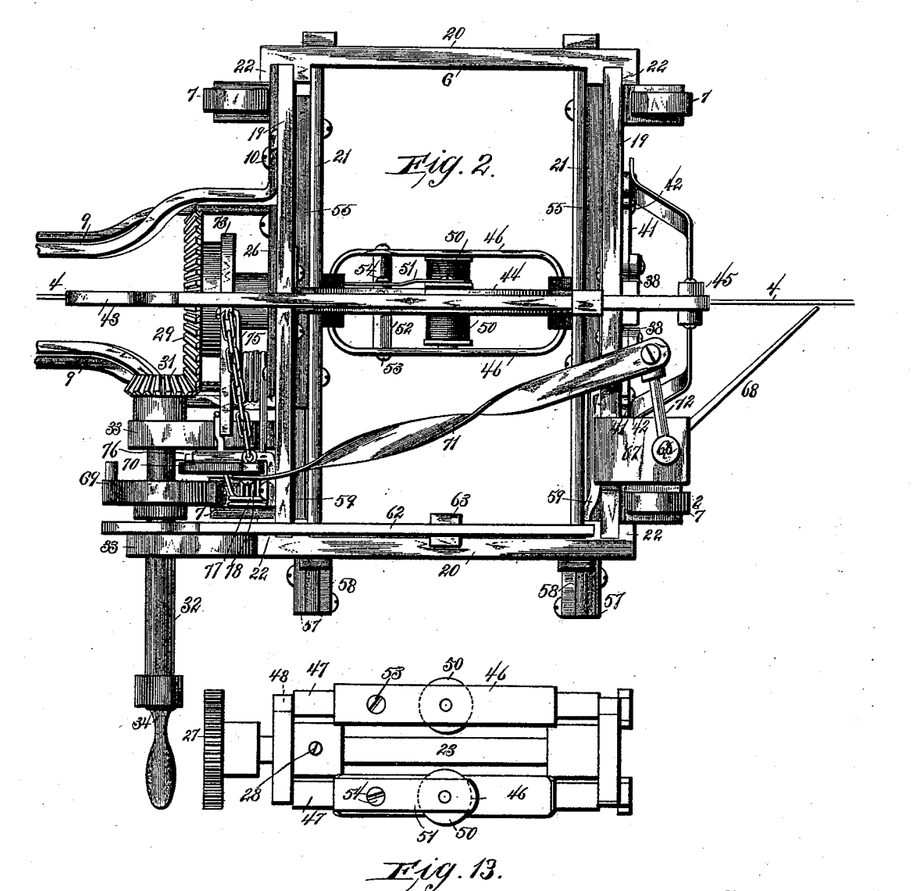
Fig. 2 is a top plan view of the machine.
Fig. 13 is a view of one of the twisters and its bobbin frames detached.
Figure 3:
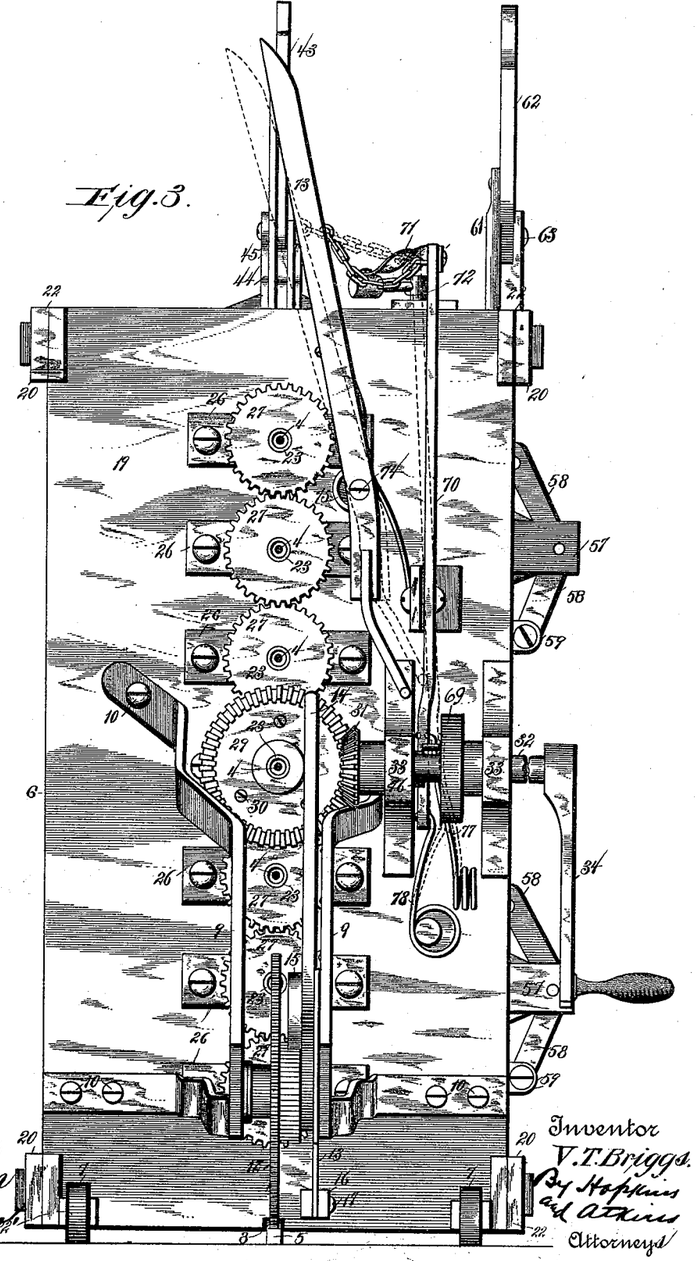
Fig. 3 is an end view, looking toward the gears and driving mechanism, and showing the aligning-bar lever in the elevated position; and showing it in the depressed position by dotted lines.
Figure 4:
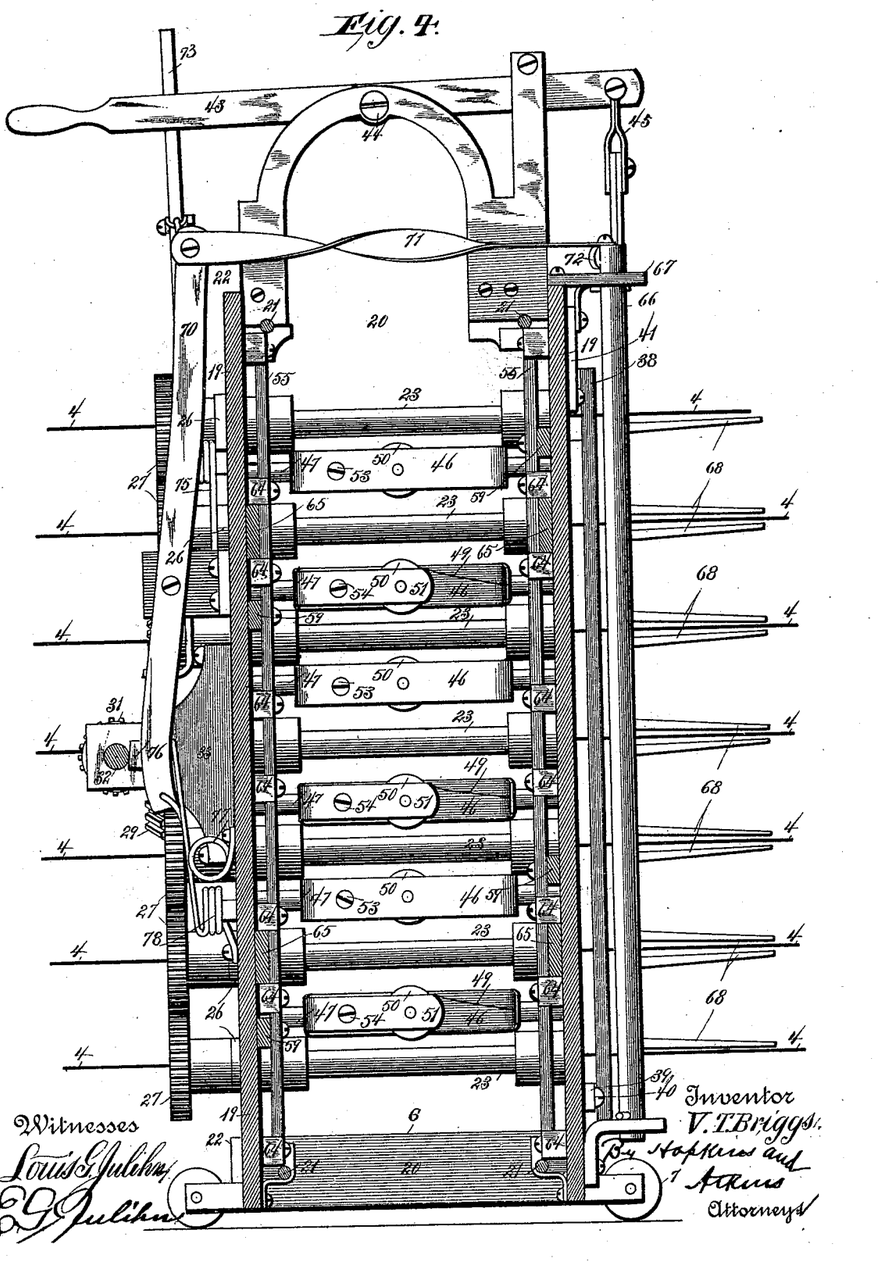
Fig. 4 is a longitudinal vertical section, taken in front of the finger-gate and its lever, and showing the relative position of the parts when the finger-gate is open.
Figure 5:
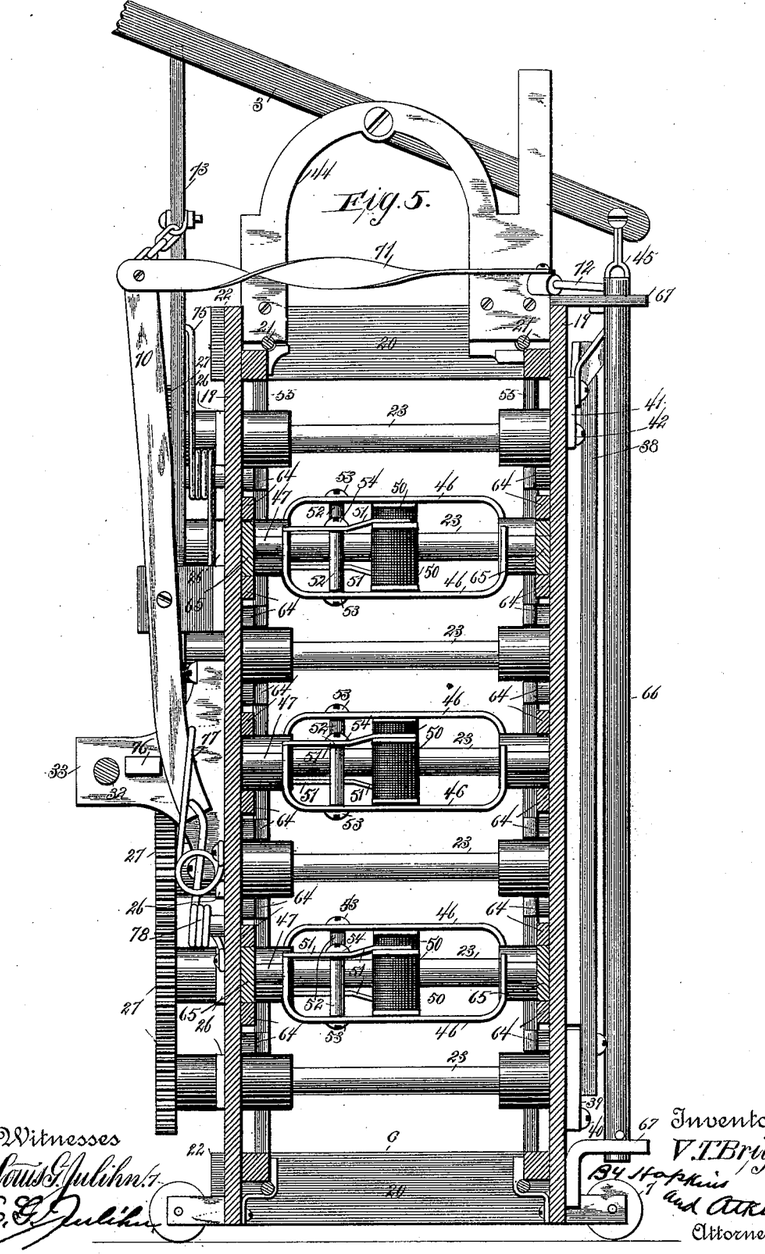
Fig. 5 is a similar view, showing the relative positions of the parts when the finger-gate is closed.
Figure 6:
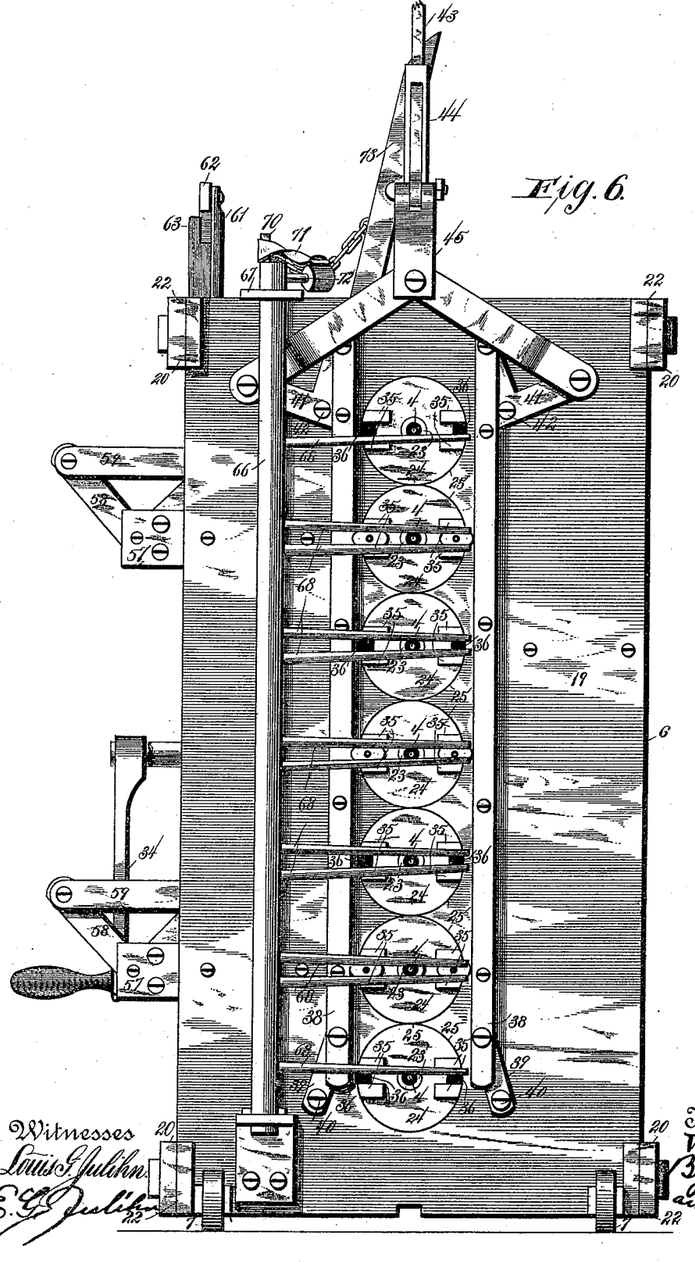
Fig. 6 is a view of the opposite end, with the aligning-bar lever raised, and the aligning-bars open.
Figure 7:
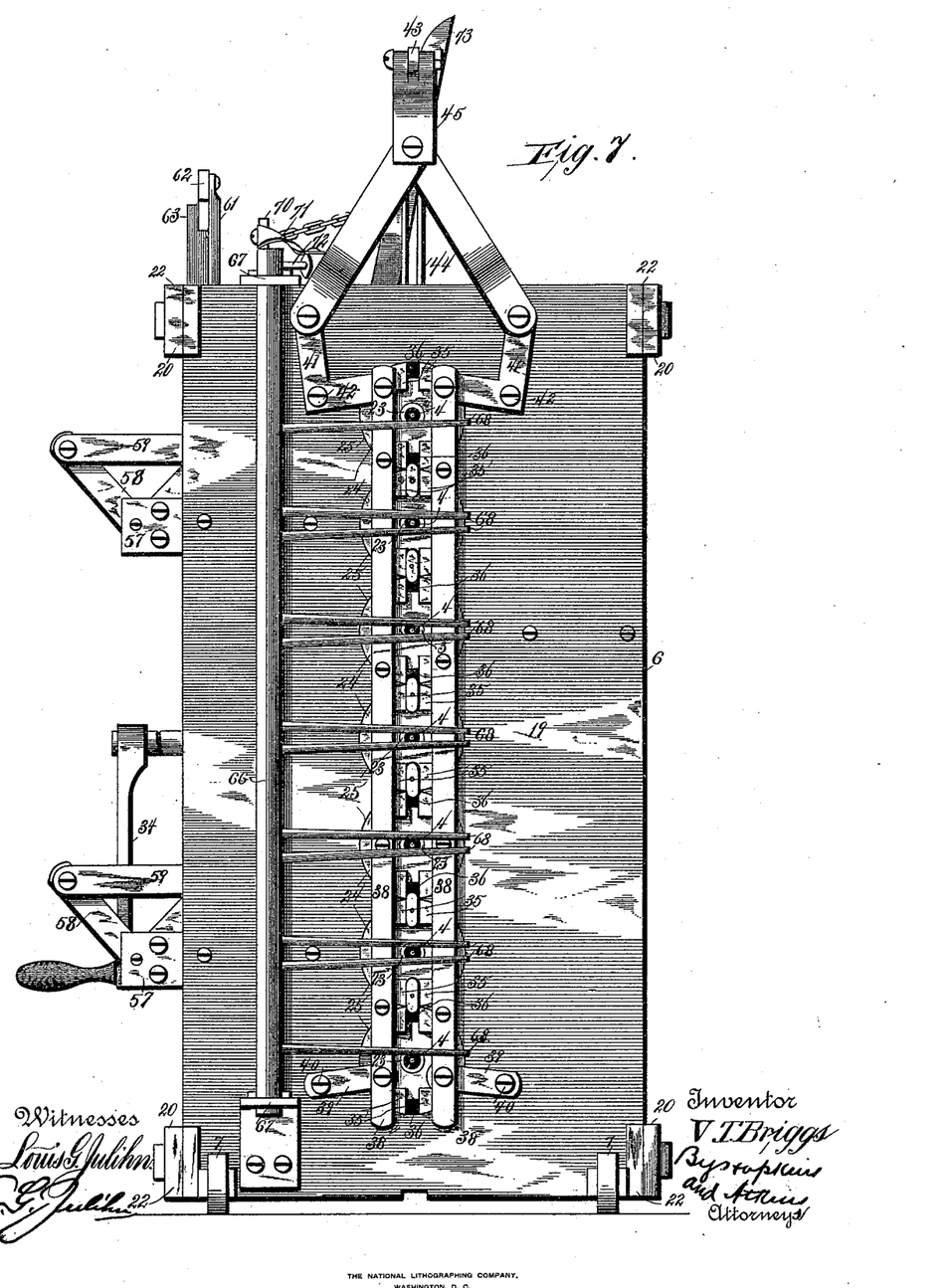
Fig. 7 is a similar view, showing the aligning-bar lever depressed, and the aligning-bars in the position for performing their office.
Figure 8:
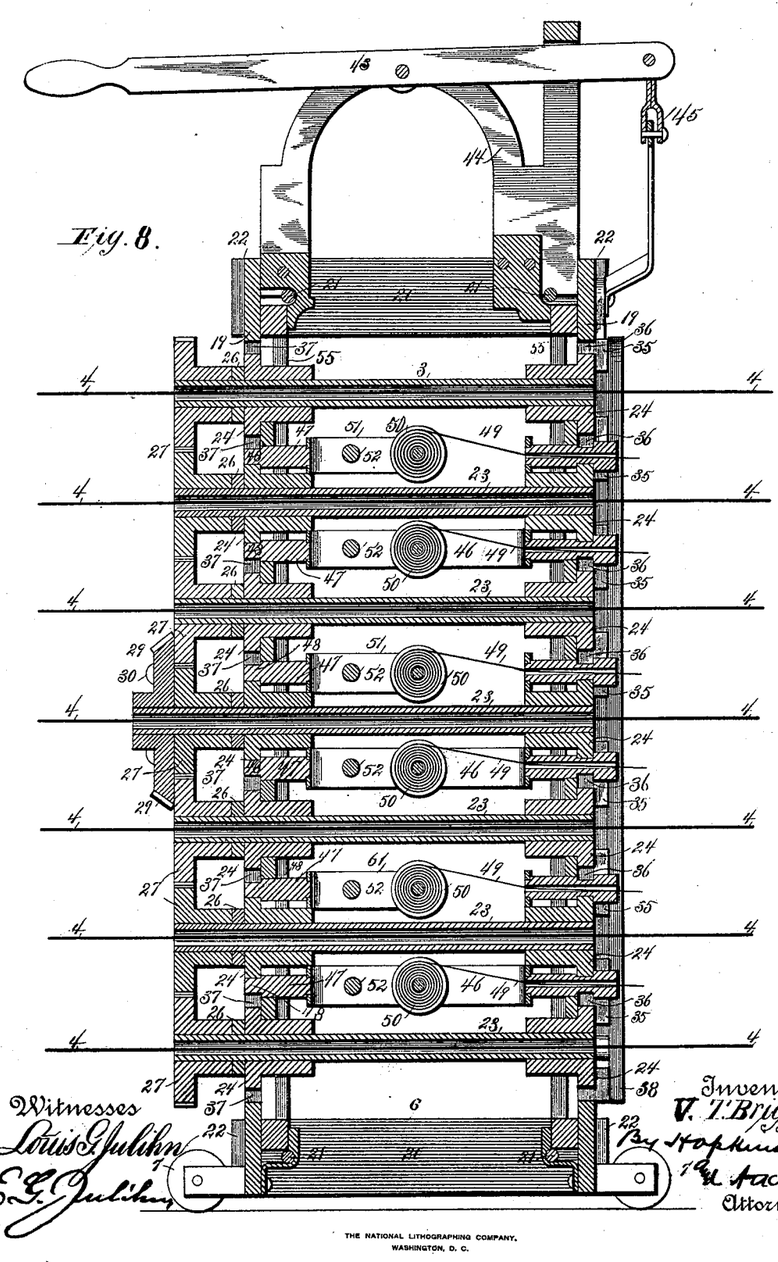
Fig. 8 is a central vertical longitudinal section of my machine.
Figure 9:
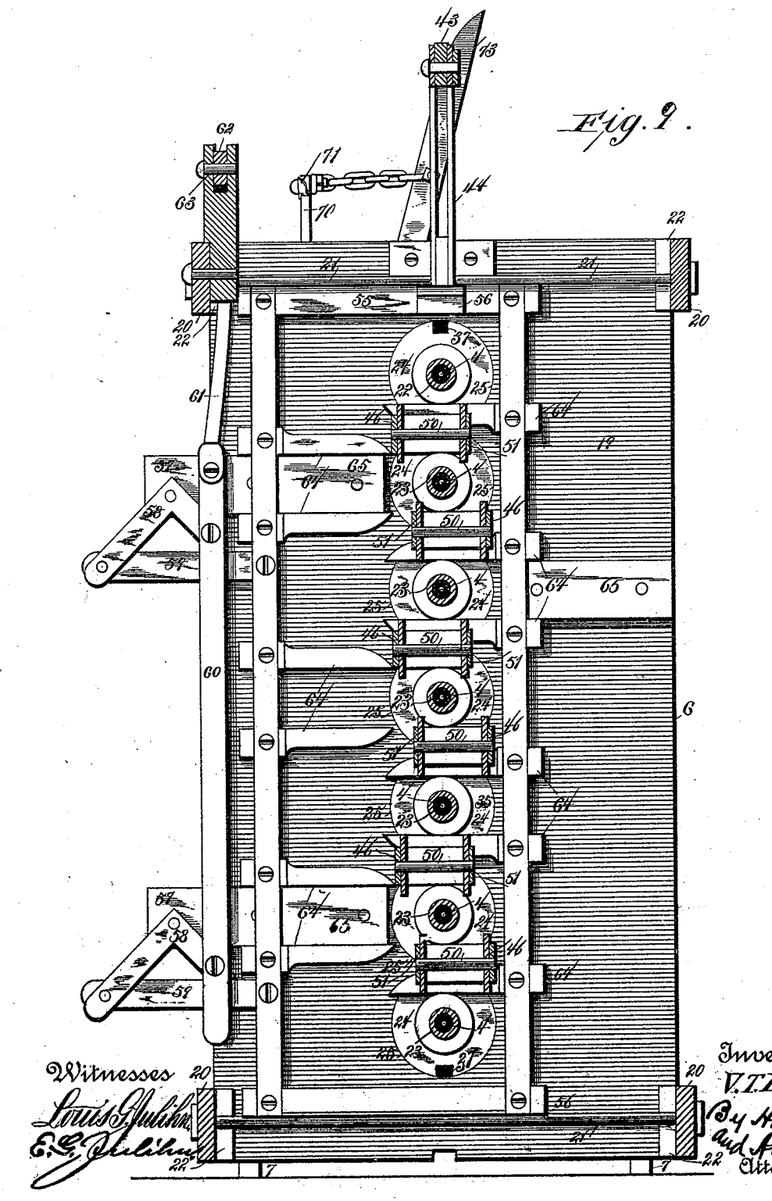
Fig. 9 is a section at right angles thereto, taken through the spools of the bobbin frames, looking toward the geared ends of the twisters, and showing the reversing mechanism in position for forcing the bobbin frames into one set of twisters.
Figure 10:
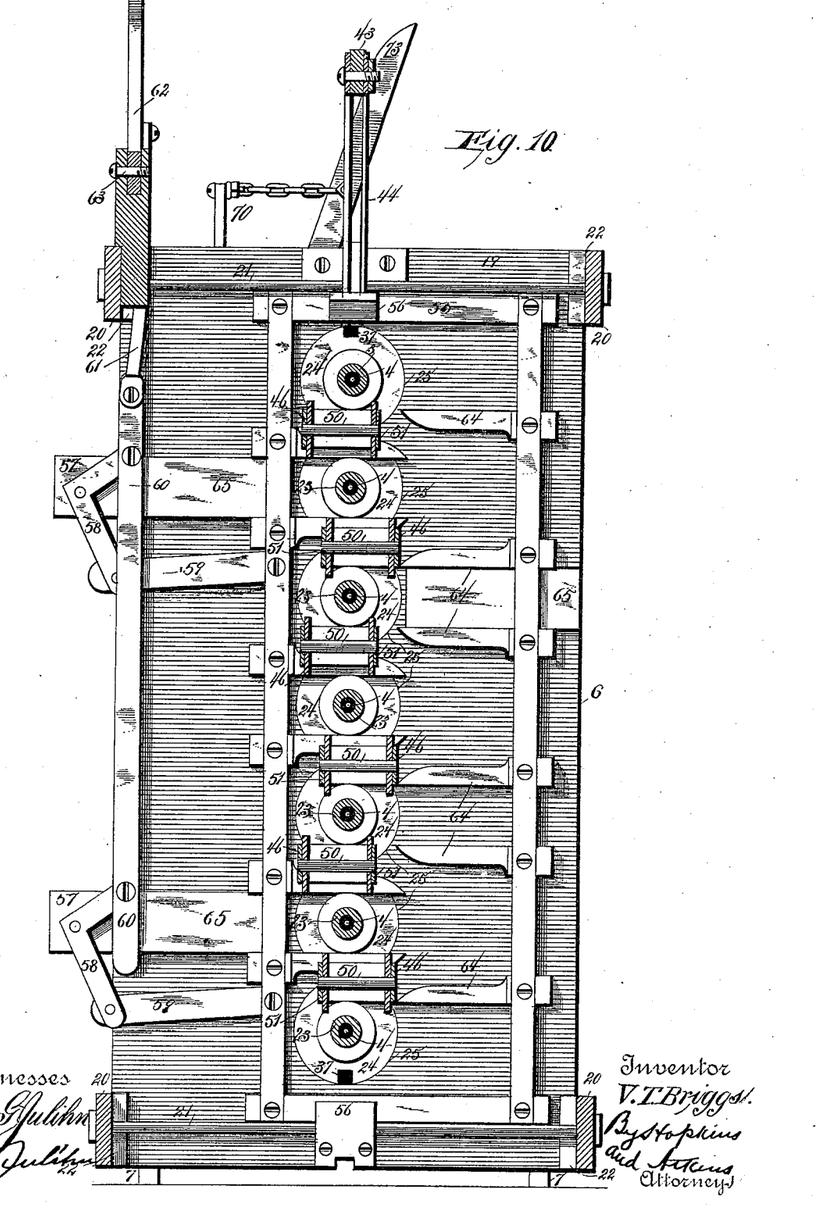
Fig. 10 is a similar view, showing reversing mechanism in the opposite position from that shown in Fig. 10.

By reference to Fig. 1 of the drawings it will be seen that my fence is formed by twisting the mesh wires around the warp wires, and alternating from one of the warp wires to the other to form a diamond shaped mesh. It will be perceived that when the bobbin frames are carried upon one set of twisters, and motion is imparted to the twisters through their gears in the manner above suggested, the mesh wires will be wrapped around the warp wires. If now the frame is moved a certain distance, it will be necessary, in order to cause the twisters to wrap the mesh wires around the adjacent warp wires to form the diamond shaped mesh, as above suggested, that the bobbin-frames shall be shifted from one set of twisters to the other. For this purpose I employ what I call reversing mechanism. It consists preferably of a rectangular frame 55, movably secured in suitable bearings 56 to the inside of each of the end plates of the frame.

Figure 11:
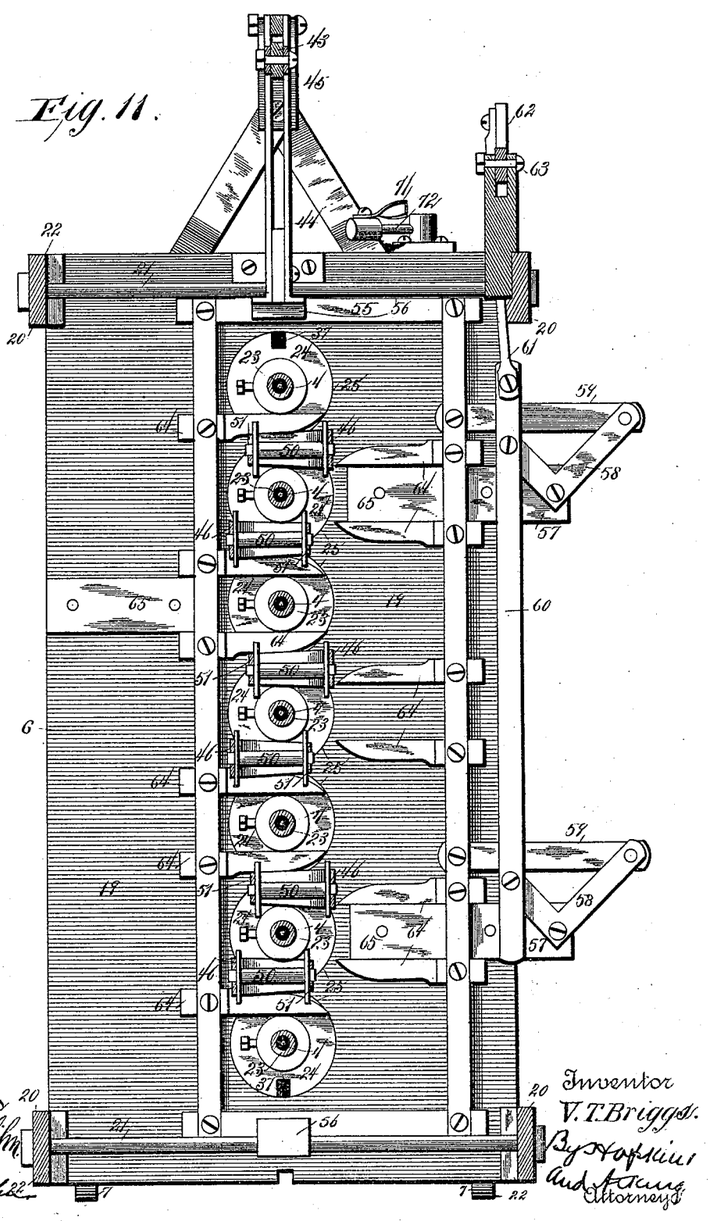
Fig. 11 is a central vertical section of my machine, looking toward the twisting ends of the twisters; and showing the reversing mechanism in the same relative position as that shown in Fig. 9.
Figure 12:
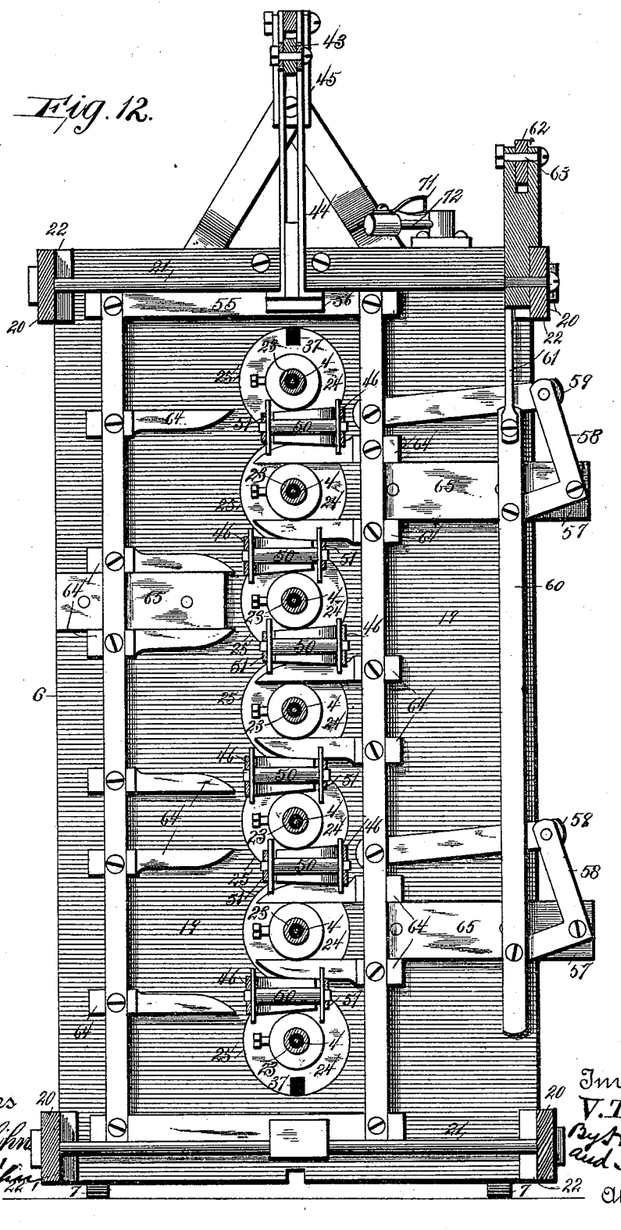
Fig. 12 is a similar view, showing the reversing mechanism in the same relative position as that shown in Fig. 10.

57 indicates lever supports, to which are pivoted bell-crank levers 58 that are pivotally secured at one end respectively to arms 59 extending outwardly from the frame; and the two bell-crank levers upon each end plate are united respectively by pitmen 60, which are pivotally united to connecting rods 61 that are united in like manner to a hand lever 62 upon opposite sides of its fulcrum or pivotal support 63, carried upon one of the upper cross pieces of the frame. The opposite sides of the frame 55 are provided with alternately arranged pairs of wedges 64. By the operation of the lever 62 the pairs of wedges 64 upon one side of the frame are forced between the hubs of the disk-heads of the twisters, and the bearing ends of the bobbin-frames and the aligning bars being previously set, as above described the squared ends of the bobbin frames are forced into the notches in the disk-heads of the twisters, and being held there are caused to rotate with the twisters. By operating the lever in the opposite direction the aligning bars having been previously set, the pairs of wedges formerly in operation are withdrawn, and the pairs of wedges upon the opposite sides having been inserted between the hubs of the disk-heads and the bearing ends of the bobbins, reverse the position of the bobbins and shift them from one set of twisters to the other. For guiding the frames 55 with greater accuracy I prefer to elongate the lever supports 57, see Fig. 11, so that they pass between the adjacent pair of wedges; while upon the opposite side of the end plates I provide a special guide-plate 65 between a pair of wedges on that side of each of the end plates.

In addition to the mechanism above described for wrapping the mesh wires around the warp wires alternately, it is necessary to provide means for securing uniformity of the places at which the twisting of the mesh wires around the warp wires is made. For this purpose I employ a finger-gate 66, pivoted in suitable bearings 67 at the top and bottom of one of the end plates which carries the twisting ends of the twisters. 68 indicates fingers projecting in pairs from the finger-gate, and adapted to follow behind the mesh wires and fix uniformly the places at which they begin to wind around the warp wires. Since the top and bottom wires have but one mesh wire it is not necessary to provide a pair of fingers for those warp wires, but one is sufficient for the purpose.

The finger-gate is automatically operated by the rotation of the main driving shaft 32 in the following manner: A cam or eccentric 69 is secured to the shaft between its bearings in operative proximity to a pivoted lever 70 that is pivotally secured to a cross-bar 71 that is pivoted to an arm 72 projecting from the top of the finger-gate. 73 indicates a lever pivoted, as indicated at 74, to the end plate of the frame, and actuated in one direction by a spring 75. This lever projects upwardly in the path of the aligning bar lever 43, and when that lever is depressed opposes its resistance to the lateral movement of the lever 70; but when the bar is raised it is swung out of the way of that lever by the action of the spring 75. 76 indicates a lock-block secured to the inner bearing piece 33 of the main shaft, and is adapted to lock and hold the finger-gate closed when the machine has begun to operate. 77 indicates a spring adapted to urge the lower end of the lever 70 toward the eccentric. 78 indicates a spring adapted to urge it laterally against the end of the lever 73 and the projection 76 upon the bearing piece. When the parts are in the proper position and the shaft 32 begins to operate, the eccentric presses the end of the lever 70 against the resistance of the spring 77 until the lever passes the side of the projection 76, when it is immediately forced behind it and locked in place by the action of the spring 78. Afterward the shaft and eccentric are free to rotate without operating the lever 70. It should be observed in this connection that when the twist of the mesh wire around the warp wire is completed and it becomes necessary to advance the machine to form another mesh, the aligning bar lever being depressed, operates against the lever 73 and forcing it against the lower end of the finger-gate lever pushes it from behind the projection 76 upon the bearing piece 33; thereby opening the finger-gate and putting the parts in position for the repetition of the operation, as above described.

The operation of my device is as follows: The warp wires having been properly threaded through the hollow shafts of the twisters and stretched between the supports, and the mesh wires having been secured to the support from which it is proposed to weave the fence, the aligning bars having been pressed together to bring the bobbin frames into proper alignment, and the reversing mechanism having been operated to properly set the bobbin frames in the twisters, the aligning-bars are then separated and power is applied to the shaft 32. Thereupon the eccentric upon that shaft automatically operates the finger-gate in the manner above described, and the shaft 32 operating through the gears causes the twisters to wrap the mesh wire around the warp wire. Then the frame having been caused to travel a predetermined distance, the reversing mechanism is operated in the manner above described to shift the bobbin frames from one set of the twisters to the other, and the operation is repeated as before.

While I have herein illustrated and described what I consider at present the preferable embodiment of my invention, I do not desire to be understood as limiting myself to the details of construction herein specified; but reserve the right to modify or vary them at will within the scope of my invention.

In illustrating my machine as in use as shown in Fig. 1 of the drawings, and in describing its operation I have considered all the twisters as in operation. Under such conditions my machine is adapted to produce a certain kind of fence, as illustrated; but many varieties of fence may be produced by leaving out certain of the warp wires, and by the manipulation of the reversing mechanism.

I do not consider it necessary to point out all the different forms of fence which may be produced by my machine; but have thought that it is sufficient to explain its operation in making a particular form of fence, and to indicate that it is adapted to be used for making other varieties, which may be readily determined by any ordinary operator in using the machine.

What I claim is—

1. In a fence machine, the combination with a frame, a plurality of twisters and movable bobbin frames therein, of parallel moving aligning bars adapted to carry all of the bobbin frames in alignment for shifting them, and mechanism for operating the aligning bars, as set forth.

2. In a fence machine, the combination with a frame, of a plurality of twisters having disk heads, notches in the disk heads, guide plates on opposite sides of the notches, bobbin frames carried on the twisters and provided with squared ends adapted to work in the notches, aligning bars adapted to hold the notches in alignment, and reversing mechanism for shifting the bobbin frames, substantially as and for the purpose specified.

3. In a fence machine, the combination with a frame, and a plurality of twisters having disk-heads and notches thereon, of movable bobbin frames carried upon the twisters, parallel movable aligning bars, a lever operatively connected with the aligning bars to open and close them, and reversing mechanism for shifting the bobbin frames, substantially as set forth.

4. The combination with a plurality of twisters provided with notched disk heads, movable bobbin frames carried upon the twisters, a movable frame provided with alternately arranged pairs of wedges, and mechanism for operating the frame for inserting the wedges between the bobbin frames and the disk head hubs for shifting the position of the bobbin frames from one set of twisters to another, substantially as and for the purpose specified.

5. In a fence machine, the combination with a frame and a plurality of twisters having notched disk heads, movable bobbin frames thereon, a movable frame upon the main frame, wedges upon the movable frame adapted to shift the position of the bobbin frames, bell-crank levers carried upon the main frame and connected respectively with the movable frame and with pitmen, and a lever operatively connected with the pitmen to work the frame and shift the bobbins, substantially as set forth.

6. In a fence machine, the combination with a frame, twisters and bobbin frames, of a finger-gate provided with fingers, and mechanism for operating the twisters and automatically operating the finger-gate, substantially as set forth.

7. In a fence machine, the combination with a frame, twisters, and bobbin frames, gears connecting the twisters, a driving shaft, a finger-gate provided with fingers, a lever operatively connected with the finger-gate, and an eccentric upon the driving-shaft adapted to operate the lever to swing the finger-gate, substantially as set forth.

8. In a fence machine, the combination with a frame, twisters, and movable bobbin frames, of aligning bars and a lever operatively connected therewith, intermeshing gears upon the twisters, a main driving shaft operatively connected with the gears, a spring-actuated lever in the path of the aligning bar lever, a finger-gate, a lateral and forwardly spring-actuated lever operatively connected therewith, an eccentric carried upon the driving-shaft, and a lock-block upon the bearings of said shaft, all cooperating, as and for the purpose specified.

In testimony of all which I have hereunto subscribed my name.

VANRENSSELAER T. BRIGGS.

Witnesses:
JOSEPH L. ATKINS,
LOUIS G. JULIHU.